Oct. 27, 1936. C. G. BLISS Re. 20,141

MEASURING APPARATUS

Original Filed May 2, 1930 4 Sheets-Sheet 1

INVENTOR
CARL G. BLISS
BY A. B. Bowman
ATTORNEY

Oct. 27, 1936. C. G. BLISS Re. 20,141

MEASURING APPARATUS

Original Filed May 2, 1930 4 Sheets-Sheet 2

INVENTOR
CARL G. BLISS
BY A. B. Bowman
ATTORNEY

MEASURING APPARATUS
Original Filed May 2, 1930 4 Sheets-Sheet 3
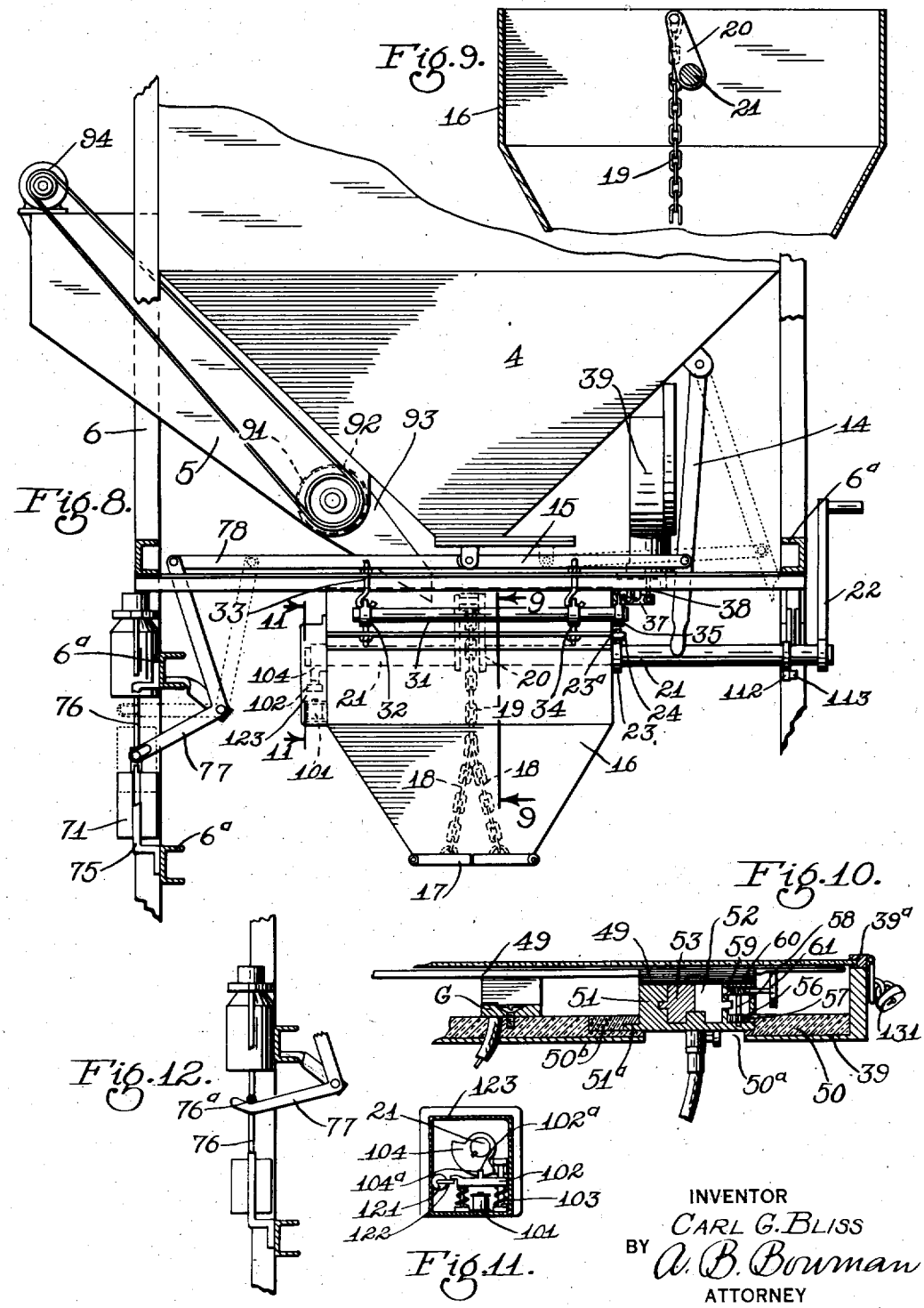

MEASURING APPARATUS

Original Filed May 2, 1930 4 Sheets-Sheet 4

INVENTOR
CARL G. BLISS
BY A. B. Bowman
ATTORNEY

Reissued Oct. 27, 1936

Re. 20,141

UNITED STATES PATENT OFFICE 20,141

MEASURING APPARATUS

Carl G. Bliss, Los Angeles, Calif., assignor, by mesne assignments, to Standard Steel Works, Los Angeles, Calif., a corporation of California Original No. 1,826,919, dated October 13, 1931, Serial No. 449,111, May 2, 1930. Application for reissue November 8, 1932, Serial No. 641,808

46 Claims. (Cl. 249—14)

Figure 1:
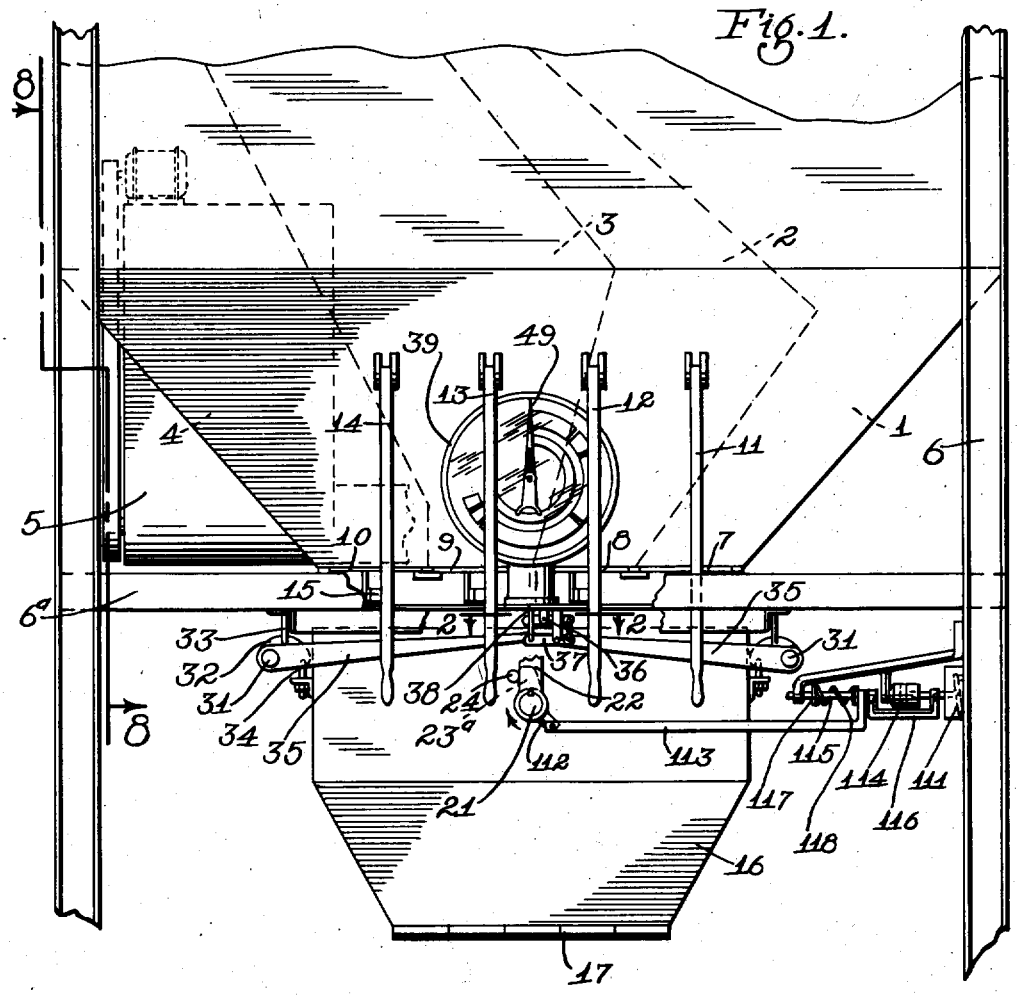

My invention relates to measuring apparatus, and particularly for measuring designated quantities of materials or substances from different containers, or for measuring and mixing ingredients from certain containers in designated proportions.

In paving plants, as well as in many other industries, it is desirable and essential that the ingredients of the mixes or products manufactured or prepared be combined in designated proportions to obtain the desired results from the mixes or products. Heretofore the weighing out, or otherwise measuring of the ingredients, or the proportioning of the same, in the mixes or products, has been left entirely, or substantially entirely, to the operator or operators of the plants or apparatus and to his or their alertness, skill, ability and integrity. As a result, in many instances, inferior mixes or products have been manufactured or prepared by reason of the elimination or omission of certain ingredients, through shortage or otherwise, or by reason of substitutions of improper or undesirable ingredients, because of shortage of such ingredients or otherwise. Such short weighting or measuring of ingredients, or the elimination of some of the ingredients, or the substitution of other ingredients in the mixes or products, is very common in the production of paving materials, or other similar materials, even though the operation of the plant preparing such materials is closely supervised.

The objects of my invention are: first, to provide a measuring apparatus which will eliminate the defects of former systems of measuring and weighing out substances or ingredients for mixes or products to be prepared according to designated specifications, and to provide a measuring apparatus which will reduce to a minimum the short weighing or measuring of the ingredients making up certain mixes or products, or the short weighing of batches of such mixes or products, or the substitutions of different ingredients or substances and which will, as a whole, eliminate to a large extent the human element usually involved in the measuring of quantities of certain substances or products; second, to provide a measuring apparatus whereby different ingredients or substances contained in different storage containers are weighed out or measured out in predetermined amounts or proportions and discharged in sequence on or into a common receiver or receptacle; and, further, to provide such an apparatus in which the ingredients or substances from the different bins or containers are accurately and quickly weighed or measured out according to standard units of measure; third, to provide an apparatus of this class whereby the ingredients or substances in the different storage containers are drawn off or removed in sequence and in such manner that the ingredients or substances cannot be drawn off or removed from other containers until the full predetermined amount is first removed from one container from which a portion of the designated quantity is removed and particularly by means whereby all but one of the discharge control means of the containers or bins are locked until the designated amount of substance is discharged from that one container, thus providing an apparatus which is so constructed and arranged that all of the discharge control means are operated during each cycle before any of the discharge means can again be operated; and, further, to provide an apparatus of this class in which the discharge of the ingredient or substance from one bin or container is automatically begun as the discharge of the foregoing bin in a predetermined series is concluded or nearly concluded; fourth, to provide an apparatus of this class in which the measured quantities of substances or ingredients from the different containers are discharged into a measuring receptacle in which the substances or ingredients discharged thereinto are measured and by which measuring thereof the discharge of the substances or ingredients thereinto is regulated or controlled; fifth, to provide an apparatus having such a measuring receptacle from which the substances cannot be discharged until the full amount of each ingredient or substance in their predetermined proportions are discharged into such receptacle; sixth, to provide gates for storage containers or hoppers which are self-closing and the openings of which are controlled automatically by measure regulating means, said gates being held open until the desired or predetermined quantity of ingredients or substance is drawn off or removed from the particular storage container; seventh, to provide a novel measure regulating means whereby definite predetermined measured quantities of substances are removed from particular storage containers during each cycle; eighth, to provide a novel measure regulator whereby the quantity or amount of material or substance taken from the individual containers, as well as the total amount of the material or substance taken from all of the containers at one time or during one cycle may be weighed or otherwise measured, and such means which controls the removal or the gate controlling the removal of material or substance from the several containers in such manner that the designated or predetermined amounts of substances or materials are removed therefrom; ninth, to provide a measure regulator of this class which also controls the final dumping of the ingredients or substances after they have been measured out and discharged into other receivers; tenth, to provide a measure regulator of this class whereby the quantities of substances or materials to be measured out from each of the storage containers may be varied as desired by authorized persons to vary the proportions or specifications of the mix or product, or to vary the quantity of the total batch; eleventh, to provide novelly constructed electrical contacts and a novel arrangement of such contacts with the measure indicator of a weighing scale or other measuring means, whereby successive circuits are made and broken for controlling the discharge gates of storage containers; twelfth, to provide novel gravity controlled discharge gates and novel means for opening such gates under predetermined conditions; thirteenth, to provide measuring apparatus of this class which may be so modified that the discharge gates of the several storage containers may be closed manually, if desired, and thereby stopping the operation of the apparatus, but in which none of the gates of the other containers may be opened until the first mentioned gate is again opened and the full predetermined quantity of material or substance first discharged from such first storage container; fourteenth, to provide a novelly constructed mechanism for operating the main discharge or batch dumping gate, so that the same may be positively held in a closed position, when the bin controlled thereby is being filled, and yet one which may be easily manually opened when the bin is filled; fifteenth, to provide as a whole a novelly constructed, arranged and operated measuring apparatus of the class mentioned; and, sixteenth, to provide a measuring apparatus of this class which is very simple and economical of construction, proportionate to its manifold functions, one which is durable, reliable, efficient, one which may be easily operated and controlled, as well as adjusted, and which will not readily deteriorate or get out of order.

Figure 3:
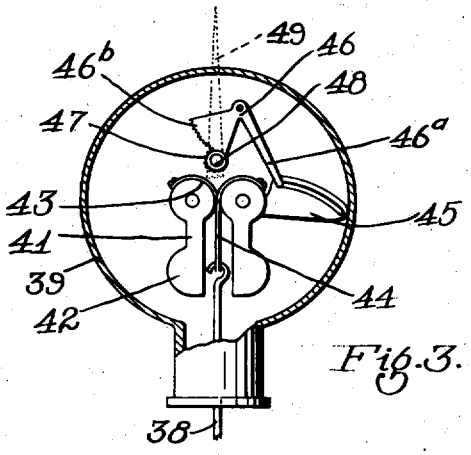
Figure 2:
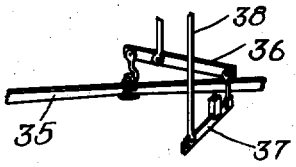
Figure 4:
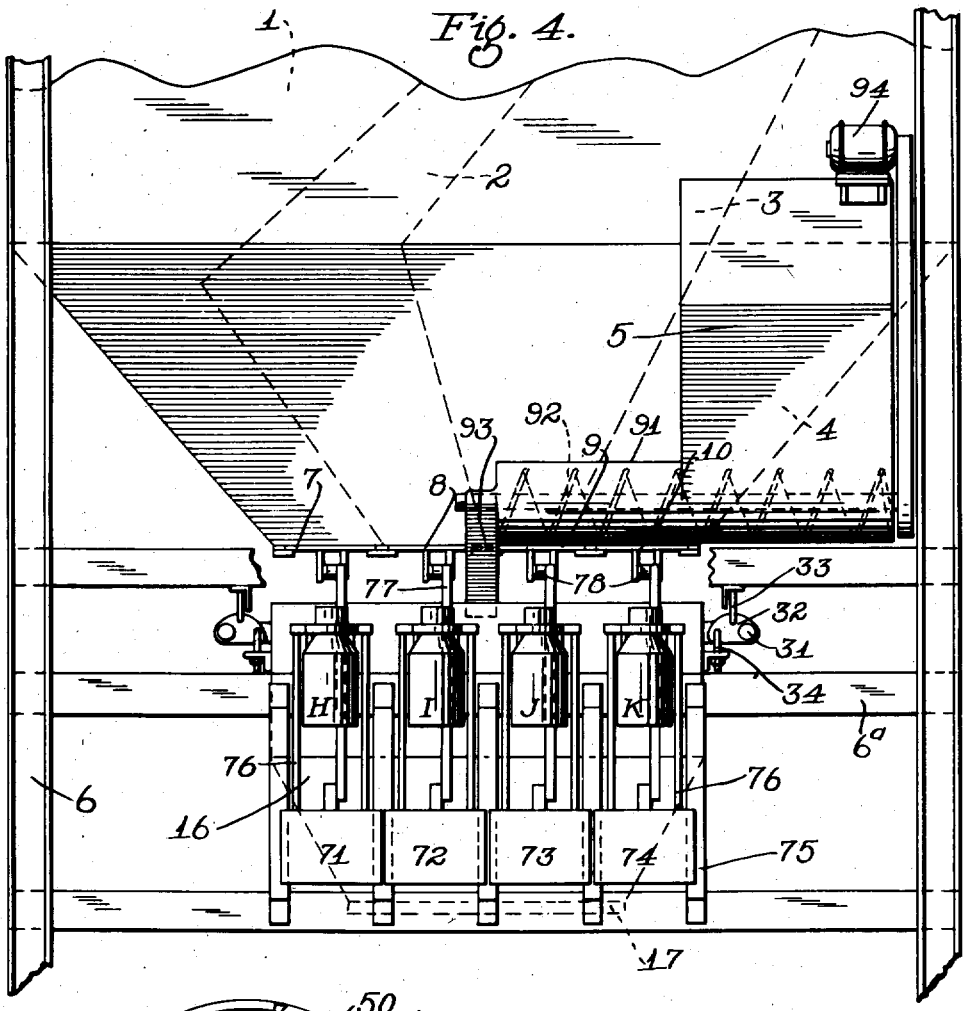
Figure 5:
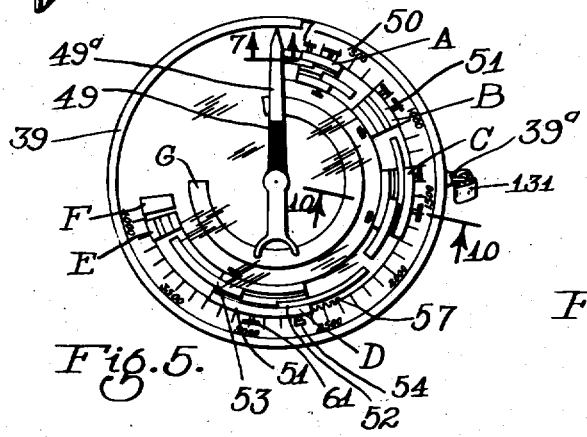
Figure 6:
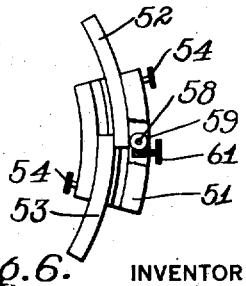
Figure 7:
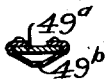
Figure 13:
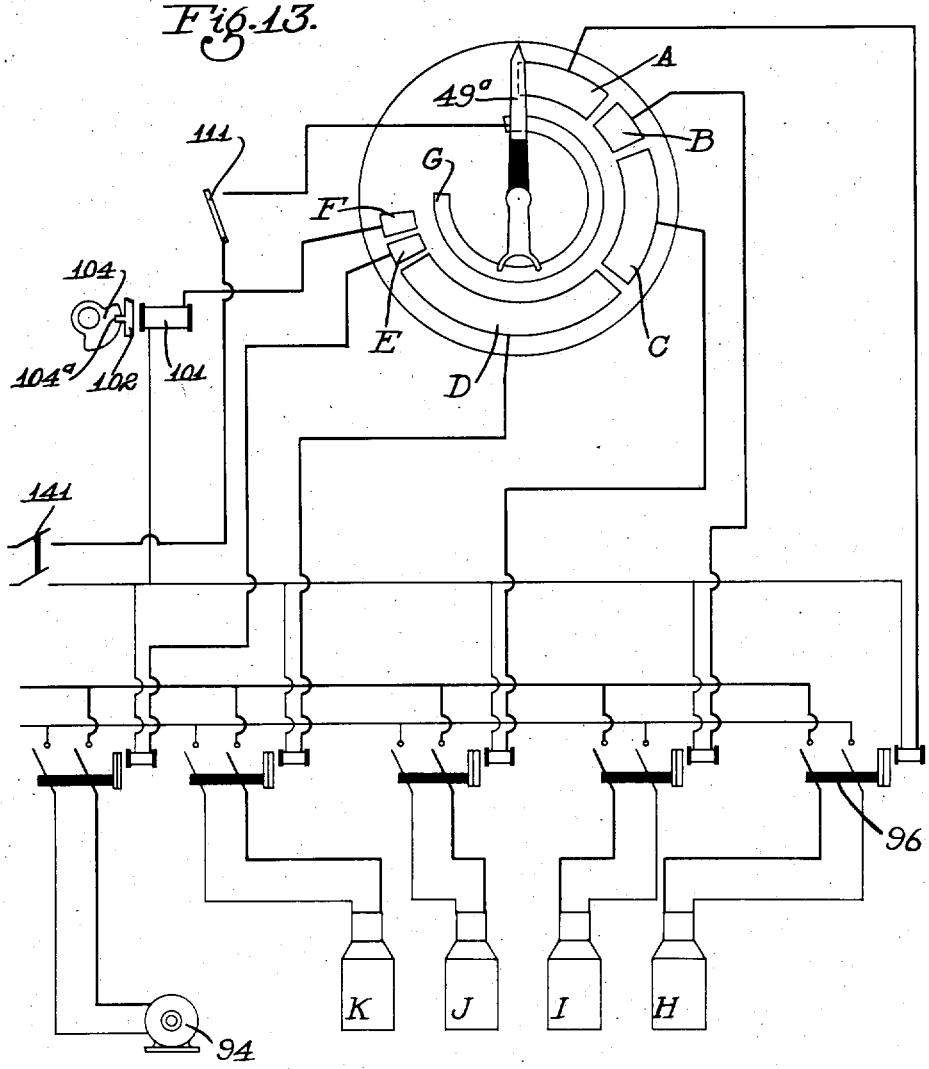
Figure 14:
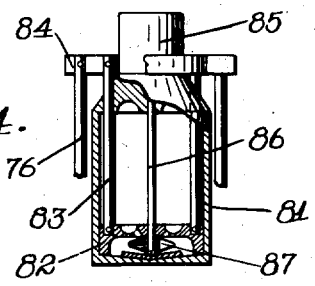

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a fragmentary front elevational view of the storage containers and measuring receptacle or weigh hopper of a paving plant incorporating my measuring apparatus in one form of construction; Fig. 2 is a fragmentary sectional view in plan, taken at 2—2 of Fig. 1, showing a link connection between the weigh hopper and the weighing scale; Fig. 3 is a fragmentary sectional view showing the interior operating mechanism in diagrammatic form of a weighing scale, certain parts being shown in elevation to facilitate the illustration; Fig. 4 is a fragmentary rear elevational view of such paving plant incorporating my invention; Fig. 5 is a front or face view of the face of the weighing scale showing adjustable contacts thereon; Fig. 6 is an enlarged fragmentary view of one of the adjustable contacts; Fig. 7 is an enlarged transverse sectional view of the index arm of the weighing scale, the section being taken through 7—7 of Fig. 5; Fig. 8 is a fragmentary elevational view of the paving plant incorporating my invention, with the view taken at 8—8 of Fig. 1; Fig. 9 is a fragmentary sectional view of the measuring receptacle or weigh hopper; Fig. 10 is an enlarged transverse sectional view through the face of the weighing scale, showing primarily the mounting and adjustment of the electric contacts thereon; Fig. 11 is a sectional elevational view taken at 11—11 of Fig. 8, showing the means for controlling the gates of the measuring receptacle or weigh hopper; Fig. 12 is a fragmentary sectional elevational view of my measuring apparatus in a slightly modified form of construction whereby the gates for the storage containers may be closed manually; Fig. 13 is a wiring diagram in one form of the electric circuit of one form of my measuring apparatus; and, Fig. 14 is a longitudinal sectional view of an electrically operated hydraulic device for opening the discharge gates of the storage containers, or for permitting the manual opening thereof.

Like characters of reference refer to similar parts and portions throughout the views of the drawings.

My measuring apparatus herein disclosed is adapted for many purposes as hereinabove set forth for weighing or otherwise measuring ingredients, substances or materials, but such measuring apparatus is herein disclosed as specifically applied to the measuring of ingredients or materials in paving plants. The illustrations and description of my measuring apparatus will therefore be confined herein to its application to paving plants.

In certain types of paving plants, the ingredients or materials to be mixed for the batches, are contained in separate storage containers, designated in part as containers 1, 2, 3, 4, and 5, the containers 1, 2, 3 and 4 being here shown as divided compartments of one general storage bin, and the whole as supported upon a frame 6. In these containers are usually contained (*a*) sand passing through two hundred to ten mesh screen, (*b*) Number four rock passing through one quarter inch mesh screen and retained on ten mesh screen, (*c*) Number three rock passing one half inch to five eighths inch mesh screen and retained on one fourth inch mesh screen, (*d*) Number three rock passing one inch to one and one fourth inch mesh screen and retained on one half inch to five eighths inch mesh screen, and (*e*) dust, or ground hard rock, passing for the most part two hundred mesh screen.

At the lower ends of the storage bins or containers 1, 2, 3 and 4 are provided, respectively, discharge control means or gates 7, 8, 9 and 10, which, in this instance, are horizontally slidable and which are normally controlled or shifted by manual levers 11, 12, 13 and 14, respectively, said levers being connected to the gates by links 15.

Below the storage bins or containers 1, 2, 3 and 4, that is, below the discharge openings thereof, is positioned the weigh hopper 16, which I have herein designated as the measuring receptacle. This receptacle receives the ingredients or materials from the several storage containers and is so mounted as to weigh the materials received therein. The lower portion of the receptacle 16 converges downwardly and is provided at the lower side with a discharge opening which is normally closed by a pair of gates 17 which are hinged at their outer sides to the receptacle 16 at the edges of the opening. These gates are held in closed position over the discharge opening and with their free edges in substantially abutting relation by a pair of chains 18 connected to each of the gates 17 and to a unitary chain 19 which is connected at its upper end to a crank arm mounted at the middle portion of the receptacle 16 on shafts 21 which are connected by the crank arm 20. The crank arm is bifurcated and permits the chain 19 to be drawn slightly to one side of the center of the shafts opposite the side to which the crank arm 20 normally swings for opening or releasing the gates 17. Thus, the gates 17 are held in their closed positions by reason of the weights thereof and the weight of the materials in the measuring receptacle as shown in Fig. 9. To the extended end of the rock shaft 21 which extends to the front of the machine, is secured a crank lever 22 for releasing the gates 17 for dumping the contents of the receptacle 16. To the shaft 21 may be also secured a collar 23 having an extended lug 23*a* which is adapted to engage a stop 24 on the receptacle 16 for limiting the counterclockwise movement of the shaft 21 for preventing the crank arm 20 from being rotated beyond its gate locking position, as shown in Figs. 1 and 8.

The measuring receptacle 16 is yieldably supported on a yieldable scale frame which consists, in this instance, of a pair of parallel rock shafts 31 positioned at the opposite sides of the measuring receptacle and parallel thereto, a pair of fulcrum brackets on each of the rock shafts and extended toward the receptacle, eye bolts 33 supporting the fulcrum brackets intermediate their ends on horizontal members 6*a* of the frame 6, and supporting hooks 34 secured to the opposite outer sides of the receptacle 16 and pivotally connected at their upper ends to the inner ends of the fulcrum brackets 32, that is, to the ends of the fulcrum brackets adjacent the receptacle. To the forward end of each of the rock shafts 31, is secured one end of a main scale lever 35, the main levers of each of the rock shafts being positioned in front of the receptacle 16 and extended with their free ends toward and adjacent each other. The adjacent free ends of the main levers 35 are pivotally connected to one end of a fulcrum lever 36 which is pivotally mounted intermediate its ends on the front horizontal member of the frame 6. The opposite end of the fulcrum lever 36 is linked to one end of a second fulcrum lever 37 which is also pivotally supported intermediate its ends in the frame 6. The opposite end of the second fulcrum lever is connected to the scale actuating rod 38 which extends upwardly into the scale housing 39 which is supported in any convenient manner on the frame 6 at the front side of the paving plant.

The weighing scale here shown consists of a pair of balance arms 41 mounted adjacent each other on parallel shafts within the housing 39, balance weights 42 carried at the normally lower ends of the arms, quadrants 43 at the upper portions of the arms concentric with their pivotal axes, draft bands 44 secured and extending over the quadrants 43 and thence downwardly between the balance arms and connected at their lower ends to the upper end of the scale actuating rod 38, a pointer or index actuating cam 45, a sector 46 pivoted within the housing and having one arm 46*a* pivotally and slidably connected to the cam 45 and having concentric with its pivotal axis a quadrant gear 46*b* which meshes with and is adapted to rotate the pinion 47 mounted on the pointer or index shaft 48 to the forward end of which is secured a pointer or index arm 49 which is adapted to swing over a dial 50 at the front side of the scale housing 39.

The measure indicator or weighing scale described above also serves as a measure regulator, that is, as a means for regulating and primarily controlling the removal or discharge of a certain or predetermined quantity of material, substance, or ingredient from each of the storage bins or containers. For this purpose there is provided in connection with the scale and primarily with the face thereof a plurality of electrical contacts A, B, C, D, E, F and G. The contacts A, B, C, D, E and F are arcuate and are arranged in the same circle concentric with the pivotal axis of the pointer or index arm 49. Spaced radially inwardly from these contacts is the other contact G which is also arcuate but is continuous, that is, it extends without break over an arc equal to or greater than the combined angles of the other contacts. The contacts A, B, C, D, E and F are of angular extent corresponding with the quantity of material to be removed from one of the storage containers, as indicated on the dial of the scale when the pointer or index arm is moved thereover. The gates of the several storage containers, or other means for controlling the removal or discharge of substances therefrom, are controlled by electrical mechanism the circuit of which is controlled by the contacts on the face of the scale dial and the movable contact bar 49*a* at the outer end of the pointer or index arm of the scale, said contact bar extending from the central contact G outwardly and contacting with one of the other contacts. The contacts A, B, C and D are arcuately adjustable so as to enlarge or decrease the arc of the contact over which the pointer or index arm is adapted to ride, for increasing or decreasing the quantity of a certain material or ingredient in the batch, the arcuate extent of the contacts being determined from the weight scale on the dial or face of the scale.

Each of the contacts A, B, C, D and E consists essentially of an arcuate base 51 in and on which are arcuately adjustably mounted a pair of arcuate contacts 52 and 53 which are mounted in arcuate grooves on the base 51 and are adapted to be extended with one end a considerable distance beyond the ends of the base. The contacts 52 and 53 are secured in their shifted or adjusted positions relative to the base 51 by adjusting screws 54. The base 51 is slidably mounted in a circular arc on an electrically insulating base which forms the dial 50 of the weighing scale. In the dial member 50 is provided a long arcuate channel 50*a* over which the adjustable contacts are mounted, the bases 51 of these adjustable contacts being provided with laterally extended flanges 51*a* which ride in corresponding grooves in the edges of the dial member forming the arcuate channel 50*a*. A portion of the front side of the dial member is removable, as indicated by 50*b*, so that any one of the adjustable contacts may be removed when desired. The adjustable contacts may be adjusted, as a whole, relative to the dial member by spur gear pinions 56 which are carried on the bases 51 and which are adapted to mesh with a main ring gear 57 at the edge of the dial member having the arcuate channel 50a therein. The gear 56 is secured to a shaft 58 to the outer end of which is secured a worm gear 59 which is adapted to be rotated by a worm 60 to the outer end of the shaft of which is secured a knob 61 for rotating the worm and adjusting the adjustable contacts relative to the dial member 50 and the weight scale thereon. Each of the bases of the adjustable contacts, as well as the contact F, are connected to electric wires extending from the bases through the arcuate channel 50a in the dial member into the interior of the housing 39 of the scale.

The gates 7, 8, 9 and 10 are normally held in closed positions by weights 71, 72, 73 and 74 which are reciprocally mounted in a vertical direction on vertical guides 75 supported on the frame 6. Each of the weights is provided with upwardly extending lugs which are pivotally connected to rearwardly extending arms of bellcranks 77, the other or upwardly extending arms of which are pivotally connected by links 78 to the several gates. Each of the weight carrying rods 76 is connected to one of the hydraulic operators H, I, J and K which are also supported on the frame 6 directly above each of the weights 71, 72, 73 and 74, respectively.

The hydraulic operator, as shown in Fig. 14 of the drawings, consists of a tank or cylinder 81 mounted on the frame 6, a piston 82 reciprocally mounted therein and having push rods 83 secured thereto at the upper side and extended through the upper end of the cylinder, a cross head or yoke 84 secured to the upper ends of the push rods and to the ends or diametrically opposite sides of which are secured the rods 76 for carrying the weights, a motor 85 mounted at the upper end of the cylinder and provided with a splined shaft 86 extending from the motor downwardly into the cylinder and through the piston or plunger, and an impeller 87 mounted in the piston on the splined shaft of the motor for causing the liquid in the cylinder above the piston to be forced downwardly, when the motor is energized, to build up a liquid pressure between the piston and the bottom of the cylinder or tank which causes the piston to move upwardly and thus raising the weights and simultaneously opening the gates against the force of the weights.

The structure shown in Fig. 8 is entirely automatic, that is, as the weight of a particular gate is raised, the gate is also opened. In the modified structure shown in Fig. 12, the bellcranks 77 are not so positively connected to the weights or the rods 76, but the rods 76 in this instance are only provided with lugs or cross members 76a which serve as stops, when the weights are in their lower positions, to prevent the opening of the gates. When the hydraulic operators are actuated and the weights raised to their upper positions, the lugs or cross members 76a are raised clear of the bellcranks 77 and permit the same to be tilted and the gates to be opened manually by the levers 11, 12, 13 and 14. The gates may thus be manually closed also when desired. But it will be here noted, and as hereafter more specifically set forth, that a gate of a particular bin or storage container cannot be actuated when the predetermined amount of material is removed from the particular bin or container. It will be noted that the manual feature of the structure as disclosed in Fig. 12 may be embodied in the structure shown in Fig. 8 by removing the eye portion of the short arm of the bell crank lever 77 of the latter structure and substituting the corresponding portion of the structure shown in Fig. 12.

The dust container 5 is here shown as separate from the main bin and is not provided with a gate as in the case of the other storage containers, but the lower portion of the container 5 is provided with a tubular outlet pipe 91 in which is rotatably mounted a feed screw 92 which extends preferably over the whole of the bottom of the container 5 to the extended end of the pipe 91, the extended end of such feed pipe extending to approximately the central portion of the measuring receptacle 16 and is connected thereto by a suitable chute 93, as shown in Figs. 4 and 8. The feed screw 92 is operated by an electric motor 94 which may be connected with the feed screw in any desired manner.

The operation of the motors of the hydraulic operators and the motor 94 is controlled by the amount of material in the measuring receptacle 16, which material causes the receptacle to be lowered a predetermined amount which in turn causes the index arm 49 of the scale to be rotated about its pivotal axis connecting the contact G with one of the contacts A, B, C, D, E and F, the contacts A, B, C and D being connected to the motors of the hydraulic motors, while the contact E is connected to the motor 94. It will be noted that the electric current to the motors is not directly controlled by the contacts on the scale dial, but the same are controlled by electro-magnetic switches 96 which are directly controlled by the current passing through the contacts on the scale dial.

When the predetermined amount of material is removed or discharged from each of the storage containers, the pointer or index arm 49 engages the contact F which energizes an electro-magnet 101 and is adapted to attract an armature 102 provided with a locking lug 102a which is normally forced by springs 103 into engagement with a quadrant 104, and, when the gates 17 of the receptacle 16 are closed, into a notch 104a of the quadrant for locking the receptacle dumping crank 22 in immovable position. Thus, the dumping crank cannot be rotated and the contents of the receptacle 16 dumped until the pointer or index arm 49 engages the contact F which energizes the electro-magnet 101 and withdraws the lug 102a from the notch in the quadrant.

As the measuring receptacle 16 is dumped, the pointer or index arm again moves over the contacts on the scale dial. In order to prevent the motors of the hydraulic operators and the motor 94 from being operated during this recession of the pointer to begin a new cycle of operation, I have provided a switch 111 in the line connected with the contact G. This switch is controlled by the dumping crank 22. For this purpose the dumping crank 22, of the shaft 21, is provided with an arm 112 to the extended end of which is connected a link 113 which is adapted to open the switch 111. Such connection, however, is preferably not direct, but through a dashpot 114. In this instance, the end of the rod 113 opposite its connection with the arm 112 is slidably mounted on a rod 115 which is connected to a yoke 116 connected to the plunger rod of the dashpot and the switch 111. At the outer end of the rod 115 is provided a collar 117 between which and the end of the link 113 slidably mounted thereon there is mounted a compression spring 118. The dashpot retards the opening and closing of the switch 111 primarily for holding the switch open until the pointer or index arm is back to its zero position.

In addition to the control of the weight of the contents in the measuring receptacle, I have provided a counter 121 in connection with the measuring receptacle so that a record may be made of the batches or mixes discharged therefrom. In this instance, such counter is diagrammatically shown in a housing 123 which encloses the electro-magnet 101 and the quadrant 104. The counter 121 may be provided with an arm 122 which may be periodically depressed as the armature 102 is withdrawn from the quadrant. Thus, the only record permissible is the dumping of full charges of the measuring receptacle.

The operation of the measuring apparatus is briefly as follows:

The amount of the ingredients of a particular mix or batch must first be determined. Then the adjustable contacts A, B, C, D and E are extended or contracted circumferentially until the angle thereof corresponds with a certain weight on the scale. All these contacts are adjusted in the same manner and are then separated from each other a slight distance, preferably slightly greater than the point of contact 49*b*, shown in Fig. 7. The contact F is then spaced a similar distance from the adjacent contact E. The cover 39*a* of the scale housing is then locked, by any suitable lock 131, so as to prevent unauthorized persons from changing the adjustment. Then by throwing the main switch 141, shown in Fig. 13, the electromagnetic switch 96 connected to the contact A is energized which energizes the motor of the hydraulic operator H which opens the corresponding gate 7 and permits a certain portion of the contents of the container 1 to be discharged into the measuring receptacle 16. When this receptacle has increased in weight corresponding to the length of the arc over which the contact A extends, the electrical connection with the pointer 49 is broken by reason of the movement of the pointer 49 corresponding to the weight of the receptacle 16. The motor of the hydraulic operator H is shut off permitting the corresponding weight 71 to force the piston therein downwardly and the oil or other liquid through the ports past the impeller into the upper portion of the tank or cylinder. Substantially simultaneously therewith, the motor of the hydraulic operator I is energized when the pointer 49 engages the contact B. Thus substantially simultaneously with the closing of the gate 7, the gate 8 is opened. In the same manner all of the gates are opened and closed. When the pointer jumps from the contact D to the contact E, the motor 94 is energized rotating the feed screw 92 which feeds a certain amount of dust into the measuring receptacle, this motor 94 being again shut off, when the required amount of dust is discharged into the receptacle 16. When the predetermined amount of material is discharged into the measuring receptacle from all of the storage containers, the pointer or index arm 49 will have engaged the contact F energizing the electro-magnet 101 and withdrawing the armature from the quadrant 104 and thus unlatching the dumping crank 22 and permitting the same to be rotated and the measuring receptacle 16 to be dumped. Such dumping of the measuring receptacle opens the switch 111 and permits the pointer 49 to return to its zero position as the contents of the measuring receptacle are dumped. As soon as the pointer reaches the zero position, or shortly thereafter, and the switch 111 is again closed by the manual closing of the dumping gates of the receptacle 16, the measuring apparatus is started in a new cycle of operation. Thus, the whole operation is automatic except as to the dumping of the measuring receptacle 16 which, for the purposes of control of paving plants, is preferably not made automatic.

Though I have shown a particular construction, combination and arrangement of parts and portions of my measuring apparatus, and a certain modification thereof, and a certain modification thereof to paving plants, I do not wish to be limited to this particular construction, combination and arrangement, nor to the modification, nor to the particular application, but desire to include in the scope of my invention the construction, combination and arrangement substantially as set forth in the appended claims.

Having thus described my invention, what I claim as new and desire to secure by Letters Patent is:

1. In a measuring apparatus, storage containers, a measuring receptacle adapted to receive measured quantities of the contents of the containers, separate means for controlling the discharge of each of said containers including electric circuits each having a contact, one for each of the containers and each connected with one of the control means, and a movable contact, the movement of the latter contact being controlled by the amount of substance in the receptacle, said movable contact being adapted sequentially to engage the contacts for actuating in sequence the separate control means.

2. In a measuring apparatus, storage containers, a measuring receptacle adapted to receive measured quantities of the contents of the containers, separate means for controlling the discharge of each of said containers, a plurality of contacts, one for each of the containers and each connected with one of the control means, a movable contact, the movement of the latter contact being controlled by the amount of substance in the receptacle, said movable contact being adapted sequentially to engage the contacts for actuating in sequence the separate control means, means for discharging the contents of the measuring receptacle, and means for normally locking the latter means until the measuring receptacle is filled to the designated capacity.

3. In a measuring apparatus, storage containers, a measuring receptacle adapted to receive measured quantities of the contents of the containers, separate means for controlling the discharge of each of said containers, a plurality of contacts, one for each of the containers and each connected with one of the control means, a movable contact, the movement of the latter contact being controlled by the amount of substance in the receptacle, said movable contact being adapted sequentially to engage the contacts for actuating in sequence the separate control means, means for discharging the contents of the measuring receptacle, means for normally locking the latter means until the measuring receptacle is filled to the designated capacity, and another contact adapted to be engaged by the movable contact and connected to the last mentioned means for releasing the same when the movable contact engages the last mentioned contact.

4. In a measuring apparatus, storage containers, a measuring receptacle adapted to receive measured quantities of the contents of the containers, separate means for controlling the discharge of each of said containers, a measure indicator, means operatively connecting the measuring receptacle with the measure indicator for indicating on the indicator the contents of the receptacle, and means operatively and separately connecting the indicator with each of the control means for regulating the separate control means by the positions of the indicator.

5. In a measuring apparatus, storage containers, a measuring receptacle adapted to receive measured quantities of the contents of the containers, separate means for controlling the discharge of each of said containers, a measure indicator, means operatively connecting the measuring receptacle with the measure indicator for indicating on the indicator the contents of the receptacle, means operatively and separately connecting the indicator with each of the control means for regulating the separate control means by the positions of the indicator, means for discharging the contents of the measuring receptacle, and means for normally locking the latter means until the measuring receptacle is filled to the designated capacity.

6. In a measuring apparatus, storage containers, a measuring receptacle adapted to receive measured quantities of the contents of the containers, separate means for controlling the discharge of each of said containers, a measure indicator, means operatively connecting the measuring receptacle with the measure indicator for indicating on the indicator the contents of the receptacle, means operatively and separately connecting the indicator with each of the control means for regulating the separate control means by the position of the indicator, means for discharging the contents of the measuring receptacle, means for normally locking the latter means until the measuring receptacle is filled to the designated capacity, and means connected to the last mentioned means and adapted to be engaged by the indicator for releasing said locking means when the measuring receptacle is filled to its designated capacity.

7. In a measuring apparatus, storage containers, a measuring receptacle adapted to receive measured quantities of the contents of the containers, said quantities measured according to standard units of measure, separate means for controlling the discharge of each of said containers, a standard unit measure regulator, having a movable regulating member, means operatively connecting the measuring receptacle with the movable regulating member of the measure regulator for shifting said member in fixed proportion to the contents of the receptacle, and means operatively connecting the regulator with each of the control means for regulating the separate control means by the positions of the regulating member.

8. In a measuring apparatus, storage containers, a measuring receptacle adapted to receive measured quantities of the contents of the containers, separate means for controlling the discharge of each of said containers, a measure regulator, having a movable regulating member, means operatively connecting the measuring receptacle with the movable regulating member of the measure regulator for shifting said member in proportion to the contents of the receptacle, means operatively connecting the regulator with each of the control means for regulating the separate control means by the positions of the regulating member, means for discharging the contents of the measuring receptacle, and means for normally locking the latter means until the measuring receptacle is filled to the designated capacity.

9. In a measuring apparatus, storage containers, a measuring receptacle adapted to receive measured quantities of the contents of the containers, separate means for controlling the discharge of each of said containers, a measure regulator, having a movable regulating member, means operatively connecting the measuring receptacle with the movable regulating member of the measure regulator for shifting said member in proportion to the contents of the receptacle, means operatively connecting the regulator with each of the control means for regulating the separate control means by the positions of the regulating member, means for discharging the contents of the measuring receptacle, means for normally locking the latter means until the measuring receptacle is filled to the designated capacity, and means operatively connected to the locking means and adapted to be engaged by said movable regulating member for releasing the locking means when the measuring receptacle is filled to its designated capacity.

10. In a measuring apparatus, storage containers, a measuring receptacle adapted to receive measured quantities of the contents of the containers, said quantities measured according to standard units of measure, separate means for controlling the discharge of each of said containers, standard-unit measure regulating means operatively connected to the measuring receptacle and controlled by and in fixed proportion to the quantity of substance in the receptacle, and means operatively connecting the regulating means with each of the control means for regulating the separate control means through the regulating means by and in accordance with the quantity of substance in the receptacle.

11. In a measuring apparatus, storage containers, a measuring receptacle adapted to receive measured quantities of the contents of the containers, separate means for controlling the discharge of each of said containers, measure regulating means operatively connected to the measuring receptacle and controlled by the quantity of substance in the receptacle, means operatively connecting the regulating means with each of the control means for regulating the separate control means through the regulating means by the quantity of substance in the receptacle, means for discharging the contents of the measuring receptacle, and means for normally locking the latter means until the measuring receptacle is filled to the designated capacity.

12. In a measuring apparatus, storage containers, a measuring receptacle adapted to receive measured quantities of the contents of the containers, separate means for controlling the discharge of each of said containers, measure regulating means operatively connected to the measuring receptacle and controlled by the quantity of substance in the receptacle, means operatively connecting the regulating means with each of the control means for regulating the separate control means through the regulating means by the quantity of substance in the receptacle, means for discharging the contents of the measuring receptacle, means for normally locking the latter means until the measuring receptacle is filled to the designated capacity, and means operatively connected to the locking means and adapted to be operatively connected to the measure regulating means when the measuring receptacle is filled to its designated capacity for releasing the locking means.

13. In a measuring apparatus, storage containers, separate discharge gates for each of the containers, a measuring receptacle adapted to receive measured quantities of the contents of the containers, said quantities measured according to standard units of measure; separate means for controlling each of the gates, standard unit measure regulating means operatively connected to the measuring receptacle and controlled by and in fixed proportion to the quantity of substance in the receptacle, and means operatively connecting the regulating means with each of the control means for the gates for controlling the gates by and in accordance with the quantity of substance in the receptacle.

14. In a measuring apparatus, storage containers, a measuring receptacle adapted to receive measured quantities of the contents of the containers, separate means for controlling the discharge of each of the containers, a measure indicator having a movable index arm, a plurality of spaced contacts in connection with the indicator and adapted to be sequentially engaged by the index arm thereof, there being provided one contact for each of the containers and each connected with one of the control means, the movement of the index arm being controlled by the amount of substance in the measuring receptacle, each of the separate control means being actuated when its respective contact is engaged by the index arm.

15. In a measuring apparatus, storage containers, a measuring receptacle adapted to receive measured quantities of the contents of the containers, separate means for controlling the discharge of each of the containers, a measure indicator having a movable index arm, a plurality of spaced adjustable and extensible and contractible contacts in connection with the indicator and adapted to be sequentially engaged by the index arm thereof, there being provided one contact for each of the containers and each connected with one of the control means, the movement of the index arm being controlled by the amount of substance in the measuring receptacle, each of the separate control means being actuated when the respective contact is engaged by the index arm.

16. In a measuring apparatus, storage containers, a measuring receptacle adapted to receive measured quantities of the contents of the containers, separate means for controlling the discharge of each of the containers, a measure indicator having a movable index arm, a plurality of spaced contacts in connection with the indicator and adapted to be sequentially engaged by the index arm thereof, there being provided one contact for each of the containers and each connected with one of the control means, the movement of the index arm being controlled by the amount of substance in the measuring receptacle, each of the separate control means being actuated when its respective contact is engaged by the index arm, means for discharging the contents of the measuring receptacle, means for normally locking the latter means until the measuring receptacle is filled to its designated capacity, and another contact in connection with said measure indicator and adapted to be engaged by the index arm in sequence after the engagement of the arm with the first mentioned contacts for releasing the locking means when the receptacle is filled to its designated capacity.

17. In a measuring apparatus, storage containers, separate discharge gates for each of the containers, a measuring receptacle positioned below the storage containers and adapted to receive measured quantities of materials from the containers, weights normally closing said gates, fluid controlled means for opening each of the gates, electric motors for operating each of the fluid controlled means, a weighing scale operatively connected to said measuring receptacle, said weighing scale having a pivoted index arm and a plurality of spaced arcuate contacts arranged about the pivotal axis of the index arm and adapted sequentially to be engaged by the index arm thereof, one contact being connected to each of the motors, each of the gates being adapted to be opened in sequence when the corresponding contact is engaged by the index arm, and manual means in connection with said weighing scale for discharging the contents of the measuring receptacle.

18. In a measuring apparatus, storage containers, discharge control means for each of the containers, measuring means for said containers, said discharge control means being operatively connected with the measuring means and controlled by and in accordance with the quantity of substance discharged from the containers and when measured by the measuring means, and a receiver for receiving in absolutely predetermined sequence the measured substances from said containers.

19. In a measuring apparatus, storage containers, discharge control means for each of the containers, means for controlling the last mentioned means, standard unit measure regulating means for actuating the last mentioned means when the predetermined quantity of substance is discharged from the containers, means in connection with the measuring means for actuating the discharge control means of each container in predetermined sequence and a receiver for receiving in said predetermined sequence the measured substances of said containers.

20. In a measuring apparatus, storage containers, means for controlling the discharge of each of said containers, standard unit measuring means, and means connecting the measuring means with the container discharge control means of each container and so constructed and arranged that the discharge control means are operated in predetermined sequence.

21. In a measuring apparatus, storage containers, means for controlling the discharge of each of said containers, standard unit measuring means, means operatively connecting the measuring means with the container discharge control means of each container for actuating the latter means, and a common receptacle for receiving in predetermined sequence measured quantities of the substances of said containers.

22. In a measuring apparatus, storage containers, means for controlling the discharge of each of said containers, a common receptacle connected with said containers and for receiving measured quantities of substances therefrom, and means connected with the container discharge control means for operating the latter in absolutely predetermined sequence.

23. In a measuring apparatus, storage containers, means for controlling the discharge of each of said containers, means for measuring, according to standard units of measure, the contents discharged from said containers, the latter means being operatively connected with the control means for operating the same and stopping the discharge of the substances of the containers, a common receptacle for receiving measured quantities of the substances from said containers, and means operatively connected with the discharge control means for operating the latter in absolutely predetermined sequence.

24. In an apparatus of the class described, a receptacle having a discharge gate pivoted at the lower end thereof, a scale supporting said receptacle, a lever, a flexible member connecting the free end of the lever with the free edge of the gate, a stop for limiting the shifting of the lever slightly beyond dead center for holding said gate in a closed position, means for locking said lever, and means in connection with the scale for controlling the locking of the lever.

25. In an apparatus of the class described, a plurality of containers, means for controlling the discharge of the containers, a single common receiver for the substance of the containers, means for measuring the substances discharged from the containers, and means actuated by the latter means for causing automatic sequential opening and closing of said discharge control means.

26. In an apparatus of the class described, a plurality of containers, means for controlling the discharge of the containers, a common receiver for the substance of the containers, means for causing automatic sequential opening and closing of said discharge control means, and means for interrupting the automatic action and allowing also manual control of said discharge control means.

27. In an apparatus of the class described, a plurality of containers, a measuring receptacle adapted to receive measured quantities of the contents of the containers, said quantities measured according to standard units of measure, means for controlling the discharge of the containers, and means operatively connected with the measuring receptacle for causing automatic sequential opening and closing of the discharge control means by and when said quantities are received by said receptacle.

28. In an apparatus of the class described, a plurality of containers, a measuring receptacle adapted to receive measured quantities of the contents of the containers, said quantities measured according to standard units of measure, means for controlling the discharge of the containers, means operatively connected with the measuring receptacle for causing automatic sequential opening and closing of the discharge control means by and when said quantities are received by said receptacle, and means for interrupting the automatic action and allowing also manual control of said discharge control means.

29. In an apparatus of the class described, a receptacle having a discharge gate pivoted to close over the lower end of the receptacle, a lever, means connecting the free end of the lever with the free portion of the gate, said connecting means being shiftable slightly over and past the center of the axis of the lever when closing said gate, and a stop for limiting the shifting of the lever when the gate is closed.

30. In a measuring apparatus for discharging measured quantities of substance from each of a plurality of containers, storage containers, separate discharge control means for each of the containers, separate means for separately controlling the last mentioned means to open and close said containers, and a measure regulating means associated with the last mentioned means for automatically actuating the same in such a manner that, after a predetermined quantity of substance is discharged from one container, a portion of the substance in another container is automatically discharged.

31. In a measuring apparatus for discharging measured quantities of substance from each of a plurality of containers, storage containers, separate discharge control means for each of the containers, and a measure regulating means associated with the last mentioned means for automatically actuating the same in such a manner that, when one container is closed another is automatically opened.

32. In a measuring apparatus for discharging measured quantities of substance from each of a plurality of containers, a plurality of containers, separate discharge control means for each of the containers, means for measuring the substance discharged from each of the containers and means associated with the last mentioned means for automatically opening each of said discharge control means in sequence by and when the substance is discharged from the foregoing container in the sequence.

33. In a measuring apparatus, storage containers, discharge control means for each of the containers, measuring means, and means operatively connecting the latter with each of the former means for operating the discharge control means in proportion to the quantity registered by the measuring means, each of said connecting means being separately adjustable for adjusting the connection with the discharge control means and thereby varying directly the desired quantity of substance discharged from the containers.

34. In a measuring apparatus, storage containers, discharge gates for the containers, standard unit weighing scale means for weighing the substances discharged from said containers, said scale means having associated therewith adjustable contact means operatively connected with said gates and also provided with movable contact means movable in proportion to the quantity of substance discharged from the respective containers and adapted to engage the adjustable contact means for controlling the gates of the respective containers, said adjustable contact means being adjustable for varying directly the desired amount of the substance to be discharged from the respective containers.

35. In an apparatus of the class described, a plurality of containers, means for controlling the discharge of said containers, means for measuring the substance discharged from said containers, and means for locking all but one at a time of the discharge control means until the designated amount of substance is discharged from said one container.

36. In a measuring apparatus, storage containers, means for opening and closing each of the containers, standard unit measure regulating means for automatically actuating said means for opening and closing said containers in absolutely predetermined sequence, and a receiver for receiving in said absolutely predetermined sequence the measured substances of said containers.

37. In a measuring apparatus, storage containers, means for opening and closing each of the containers, standard unit measure regulating means for measuring the substances discharged from the containers, and means connecting the measuring means with the opening and closing means for automatically actuating the latter for opening and closing said containers in absolutely predetermined sequence.

38. In a measuring apparatus, storage containers, separate discharge control means for each of the containers, a unitary dial scale means for measuring the substances discharged from the containers and having a movable member responsive to the amount of substance discharged from the containers and operatively connected to the separate discharge means for actuating the same.

39. In a measuring apparatus for discharging measured quantities of substance from each of a plurality of containers, a plurality of containers, separate discharge control means for each of the containers, means for measuring the substance discharged from each of the containers, means associated with the last mentioned means for automatically opening each of said discharge control means in sequence by and when the substance is discharged from the foregoing container in the sequence, and means for adjusting the measuring means for discharging different quantities from each container.

40. In a measuring apparatus for discharging measured quantities of substance from each of a plurality of containers, a plurality of containers, separate discharge control means for each of the containers, means for measuring the substance discharged from each of the containers, means associated with the last mentioned means for automatically sequentially opening and closing each of said discharge control means, and means for adjusting the measuring means for discharging different quantities from each container.

41. In a measuring apparatus, storage containers, electric discharge control means for each container, measuring means for receiving material from said containers, adjustable contacts operatively connected in the circuit with the discharge control means, including a movable contact responsive to said measuring means for operating the discharge control means in proportion to the quantity registered by the measuring means, said contacts being adjustable for varying directly the desired quantity of substance discharged from the containers.

42. In an apparatus of the class described, a plurality of containers, means for controlling the discharge of the containers, means in association with the discharge control means of each container for locking the control means thereof, and means for releasing in predetermined order all of said locking means and actuating the discharge control means of each container.

43. In an apparatus of the class described, a plurality of containers, means for controlling the discharge of the containers, operative means for measuring the substance discharged from said containers, and means in association with discharge control means of each container for locking the control means thereof, and means in operative relation with the measuring means for releasing in predetermined order all of said locking means and actuating the discharge control means of each container in accordance with the operation of the measuring means.

44. In a measuring apparatus, storage containers, a measuring receptacle adapted to receive measured quantities of the contents of the containers, separate means for controlling the discharge of each of said containers, a measure regulator, having a movable regulating member, means operatively connecting the measuring receptacle with the movable regulating member of the measure regulator for shifting said member in proportion to the contents of the receptacle, and means operatively connecting the regulator with each of the control means for regulating the separate control means by the positions of the regulating member.

45. In a measuring apparatus, storage containers, a measuring receptacle adapted to receive measured quantities of the contents of the containers, separate means for controlling the discharge of each of said containers, measure regulating means operatively connected to the measuring receptacle and controlled by the quantity of substance in the receptacle, and means operatively connecting the regulating means with each of the control means for regulating the separate control means through the regulating means by the quantity of substance in the receptacle.

46. In a measuring apparatus, storage containers, separate discharge gates for each of the containers, a measuring receptacle adapted to receive measured quantities of the contents of the containers, separate means for controlling each of the gates, measure regulating means operatively connected to the measuring receptacle and controlled by the quantity of substance in the receptacle, and means operatively connecting the regulating means with each of the control means for the gates for controlling the gates by the quantity of substance in the receptacle.

CARL G. BLISS.